(12) United States Patent
Thomsen (10) Patent No.: US 8,250,833 B2
(45) Date of Patent: Aug. 28, 2012

(54) WIND TURBINE TOWER AND METHOD FOR CONSTRUCTING A WIND TURBINE TOWER

(75) Inventor: Jens Thomsen, Brande (DK)

(73) Assignee: Siemens Aktiengesellschaft, München (DE)

( * ) Notice: Subject to any disclaimer, the term of this patent is extended or adjusted under 35 U.S.C. 154(b) by 190 days.

(21) Appl. No.: 12/157,644

(22) Filed: Jun. 12, 2008

(65) Prior Publication Data

US 2009/0021019 A1 Jan. 22, 2009

(30) Foreign Application Priority Data

Jun. 20, 2007 (EP) .................................... 07012103

(51) Int. Cl.
*E04C 3/00* (2006.01)

(52) U.S. Cl. ................. 52/845; 52/745.12; 416/DIG. 6; 248/159

(58) Field of Classification Search .............. 52/40, 831, 52/838, 843, 844, 845, 296, 745.04, 745.12; 416/DIG. 6; 248/127, 158, 159; 343/890, 343/874; 174/45 R
See application file for complete search history.

(56) References Cited

U.S. PATENT DOCUMENTS

| | | | | |
|---|---|---|---|---|
| D21,074 S | * | 9/1891 | Milliken | D25/128 |
| 488,274 A | * | 12/1892 | Gray | 52/845 |
| 835,279 A | * | 11/1906 | Haskell | 52/651.02 |
| 1,959,756 A | * | 5/1934 | Ferm | 138/157 |
| 2,255,802 A | * | 9/1941 | Murch | 220/680 |
| 3,217,459 A | * | 11/1965 | Meyer | 52/28 |
| 3,882,654 A | * | 5/1975 | Yancey | 403/271 |
| 4,214,923 A | * | 7/1980 | Price | 148/529 |
| 4,248,025 A | | 2/1981 | Kleine et al. | |
| 4,934,114 A | * | 6/1990 | Lindsey | 52/40 |
| 5,012,622 A | * | 5/1991 | Sato et al. | 52/834 |
| 5,263,297 A | * | 11/1993 | Kim | 52/834 |
| 5,737,894 A | * | 4/1998 | Simpson et al. | 52/520 |
| 5,999,145 A | * | 12/1999 | Niekamp | 343/890 |
| 6,094,881 A | * | 8/2000 | Lockwood | 52/845 |
| 6,453,636 B1 | * | 9/2002 | Ritz | 52/835 |
| 6,527,134 B2 | * | 3/2003 | Hinkle et al. | 220/1.5 |
| 6,901,717 B2 | * | 6/2005 | Brunozzi et al. | 52/834 |
| 6,957,518 B1 | * | 10/2005 | Koch, Jr. | 52/849 |
| 7,116,282 B2 | * | 10/2006 | Trankina | 52/845 |
| 7,128,214 B2 | * | 10/2006 | Qiu et al. | 206/586 |
| 7,159,370 B2 | * | 1/2007 | Oliphant et al. | 52/845 |
| 7,160,085 B2 | * | 1/2007 | de Roest | 416/244 R |
| 7,253,786 B1 | * | 8/2007 | Logozzo | 343/890 |
| 7,293,814 B2 | * | 11/2007 | Blodgett, Jr. | 296/26.01 |
| 7,360,340 B2 | * | 4/2008 | Grundman et al. | 52/40 |
| 7,387,497 B2 | * | 6/2008 | Cone | 416/244 R |
| 7,392,624 B2 | * | 7/2008 | Kinzer | 52/194 |

(Continued)

FOREIGN PATENT DOCUMENTS

DE 102 23 429 C1 5/2003

(Continued)

*Primary Examiner* — Robert Canfield
*Assistant Examiner* — Brent W Herring (57) ABSTRACT

A wind turbine tower is provided, which comprises a number of segments with a polygonal cross section, each segment comprising a number of flat plates which are connected to each other so as to form the polygonal cross section. Further, a method for constructing a wind turbine tower which comprises segments assembled of flat plates is disclosed, wherein the flat plates are connected to each other so as to form segments with a polygonal cross section and the segments are connected to each other so as to form the tower.

16 Claims, 10 Drawing Sheets

U.S. PATENT DOCUMENTS

| | | | |
|---|---|---|---|
| 7,464,512 B1 * | 12/2008 | Perina | 52/651.01 |
| 7,694,476 B2 * | 4/2010 | Cook et al. | 52/296 |
| 7,877,935 B2 * | 2/2011 | Ollgaard | 52/40 |
| 2002/0140621 A1 * | 10/2002 | Harrison | 343/890 |
| 2005/0034412 A1 * | 2/2005 | Auriemma | 52/720.1 |
| 2005/0183364 A1 * | 8/2005 | Cash | 52/296 |
| 2006/0000185 A1 | 1/2006 | Wobben | |
| 2006/0213145 A1 * | 9/2006 | Haller | 52/651.01 |
| 2006/0236648 A1 * | 10/2006 | Grundman et al. | 52/726.4 |
| 2007/0294955 A1 * | 12/2007 | Sportel | 52/40 |
| 2008/0041009 A1 * | 2/2008 | Cairo et al. | 52/651.07 |
| 2009/0016897 A1 * | 1/2009 | Olgaard | 416/244 R |
| 2009/0090069 A1 * | 4/2009 | Willis | 52/79.12 |
| 2010/0071275 A1 * | 3/2010 | Mathai et al. | 52/40 |

FOREIGN PATENT DOCUMENTS

| | | |
|---|---|---|
| EP | 1 561 883 A1 | 8/2005 |
| EP | 1561883 A1 * | 8/2005 |
| WO | 2007059768 A1 | 5/2007 |

* cited by examiner

WIND TURBINE TOWER AND METHOD FOR CONSTRUCTING A WIND TURBINE TOWER

CROSS REFERENCE TO RELATED APPLICATIONS

This application claims the benefits of European application No. 07012103.3 filed Jun. 20, 2007, and is incorporated by reference herein in its entirety.

FIELD OF INVENTION

The present invention relates to a wind turbine tower and a method for constructing a wind turbine tower.

BACKGROUND OF THE INVENTION

Wind turbine towers, especially tubular steel towers for large wind turbines, are large in diameter and weight. This may cause difficulties concerning the transportation of a tower to the wind farm and the used infrastructure. Usually, the steel towers for wind turbines are produced as sections in shops and the sections are then transported to the place of installation. The towers are typically constructed of a number of sections which have a cylindrical or conical shape.

In the wind industry the requirements for larger turbines have resulted in corresponding requirements for larger wind turbine towers. Larger wind turbine towers have typically lead to larger tower section diameters and longer and heavier tower sections. The dimensions of tall towers for large wind turbine have reached limits defined by the infrastructure of various countries. The limiting aspects are typically physical limits such as free height under bridges and tunnels, allowable weights or the turning radii of roundabouts.

The increasing number of turbines in large wind projects has also caused difficulties since the equipment which is needed to transport the largest tower sections by road or by rail is highly specialised and is not found in the quantities necessary for the present number of transportations. Consequently, when a large number of projects require a substantial amount of transportation time by road, the availability of special equipment may become difficult in the project phase.

The problem has been solved by dimensioning, by the use of hybrid towers or by the use of modular towers. Dimensioning accepts the height and width restrictions of transportation routes and uses the restrictions as a design basis. This means in practice that the external tower diameter is fixed at a certain maximum value, typically 4.2 meters. When the diameter is fixed, then the wall thickness is dimensioned to provide the necessary stiffness and strength. For large turbines and tall towers this will typically lead to significantly higher weight. This causes higher costs compared with when no diameter restrictions are applied.

In a hybrid solution the problem is circumvented by extending the concrete foundations significantly above ground level, for example, as a cylindrical structure of, for instance, 10 meters height. This increases the effective hub height of a wind turbine where the tower design is not significantly influenced by a diameter restriction. However, above a certain practical height an extended foundation is expensive. Compared with a diameter restricted tower, a hybrid solution tower reaches an additional height of perhaps 15 meters.

A wide range of modular towers are well known in literature and in practice. Using a longitudinal split such solutions overcome the dimensional restrictions on transportation. However, difficulties occur in the assembly and the complexity of the modular elements.

In EP 1 561 883 A1 a tower for a wind turbine is disclosed, wherein the tower is at least partly composed of prefabricated metal wall parts characterised in that each wall part comprises an essentially quadrangular portion. The wall parts are provided with flanges for connecting the wall parts with each other.

SUMMARY OF INVENTION

It is an objective of the present invention to provide an advantageous wind turbine tower which is not limited by transportation restrictions. It is a further objective to provide a method for constructing such a wind turbine tower.

These objectives are solved by a wind turbine tower as claimed in the claims and a method for constructing a wind turbine tower as claimed in the claims. The depending claims define further developments of the invention.

The inventive wind turbine tower comprises a number of segments with a polygonal cross section. Each segment comprises a number of flat plates which are connected to each other to form the polygonal cross section. The flat plates are connected to each other by means of splice plates. The cross section of the segments may be a regular polygon, which means that the angle between adjacent flat plates has the same value. Alternatively, the cross section of the segments may be an irregular polygon, which means that the angle between adjacent flat plates varies. The segments may be connected to each other by means of splice plates, flanges, bolts, nuts, bolt extensions, washers, etc.

The use of flanges which are connected to each other inside the tower avoids a tightening of bolts from the outside of the tower. The flange connection may further comprise flanges divided into several parts which are then bolted together alternately. This means that flanges with a very large cross section can be avoided. Several segments can be bolted together with splice plates and form an element which may have a flange at each end, making it possible to lift each element into place to form a complete tower.

The flat plates can also be connected to each other by means of splice plates, flanges, bolts, nuts, bolt extensions, washers, etc. Furthermore, the flat plates can be cut using plasma, oxygen/gas or a laser.

Compared to the known state of the art modular tower solutions, which typically require rolling, bending and/or welding of the steel plates which leads to added manufacturing costs, the use of flat plates minimises the manufacturing costs by eliminating the rolling, bending and/or welding processes. Furthermore, flat plates can be delivered in cut condition by almost any steel mill and can be transported on standard truck trailers, which increases the availability of transportation equipment. Flat plates can be delivered at length up to 14 meters, which is a possible length of a segment. Moreover, flat plates are easy to surface treat by automatic blasting and surface treatment facilities so as to increase, for example, the resistance to wear and/or corrosion.

It is advantageous to use splice plates to connect the segments and also the flat plates to each other. Flat plates bolted together with splice plates or flanges eliminate the welding process and subsequent control of welds. Further, flat plates without welding have the best possible fatigue properties. Moreover, the flat plates can be easily assembled into various cross sections of towers and in this way reduce the risk of buckling of the tower shells.

The splice plates may be connected to the flat plates by means of bolts or nuts. It is advantageous if the splice plates which are used for connecting the flat plates to each other are bent. The flat plates as well as the splice plates can be made of steel or of rust resistant steel to make surface treatment redundant. Further, the flat plates and/or the splice plates can be pre-treated with friction creating material on the joining surfaces. For example, spray metallising and surface treatment with, for instance, barrier creating paint, can be applied.

Generally the flat plates may have a rectangular or trapezoid shape. In the case of a rectangular shape of the flat plates, the segments and the tower will have a cylindrical appearance. In the case of a trapezoid shape of the flat plates, the segments and the tower will have a conical appearance.

Moreover, it is not necessary that the flat plate has a flat surface. Also corrugated plates can be used as flat plates. The flat plates may advantageously have a width of 2.5 to 3 meters and a length of 10 to 14 meters. The joint between two flat plates or between a flat plate and a splice plate can comprise a seal strip or a compound to prevent water and dust from invading the tower. It is also possible to seal the gap between the flat plates if this is considered necessary to improve the visual appearance.

Each segment of the inventive wind turbine tower comprises at least 3 flat plates. However a tower segment can have any number of flat plates greater than 3, for instance, 6, 8 or 10 flat plates. The whole wind turbine tower, or at least a large diameter bottom section of the tower, may comprise the inventive segments. In other words, it is possible to combine the inventive wind turbine tower segments with state of the art wind turbine tower constructions.

The splice plates and/or the assembly of these with flat plates can be used as fixing devices for internal components in the tower such as ladders, cable ladders, cable supports, platforms and electrical boxes. These components can be positioned and fixed when the individual segments are fitted together. At least one splice plate can comprise a fixing device. It is advantageous to use splice plates with bolts especially for fixing ladder brackets, platform brackets, lift brackets or cable brackets.

The inventive method for constructing a wind turbine tower which comprises segments assembled of flat plates is characterised in that the flat plates are connected to each other to form segments with a polygonal cross section and the segments are connected to each other to form the tower. The flat plates are connected to each other by means of splice plates. The segments may be connected to each other by means of splice plates or flanges. The use of flat plates, for instance flat steel plates, for constructing a wind turbine tower allows it to assemble the segments and the tower as close to the place of installation as possible thus limiting the transport distance of tower segments with large cross sections The flat plates and/or the splice plates can be pre-treated on the joining surfaces with a friction creating material, for instance by spray metallising and surface treatment with, for example, a barrier creating paint.

The flat plate and/or the segments can be connected to each other in a horizontal position. It is advantageous if the flat plates and/or the segments are placed in a predefined position by a rotation tool for connection to each other. Each segment or the whole tower may be erected after its assembly. The assembling and the erection can advantageously take place at the place of installation in the field of the wind turbine tower. The erection of the tower or a segment can be realised by use of a crane or any other lifting device.

The advantage of the present invention is that it minimises the total costs of large wind turbine towers by reducing the total costs of production, transportation and installation. Especially the use of flat plates, for instance, flat steel plates, avoids any rolling, bending and/or welding of the steel plates. Thereby, manufacturing costs are saved and the fatigue capability is improved. Further, flat plates allow the use of standard transportation equipment, for instance ordinary truck trailers, for transportation of the parts of the tower structure from the steel supplier to the installation site. The present invention makes it possible to assemble the components for the tower structure at the installation site in an efficient and simple way.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1A:
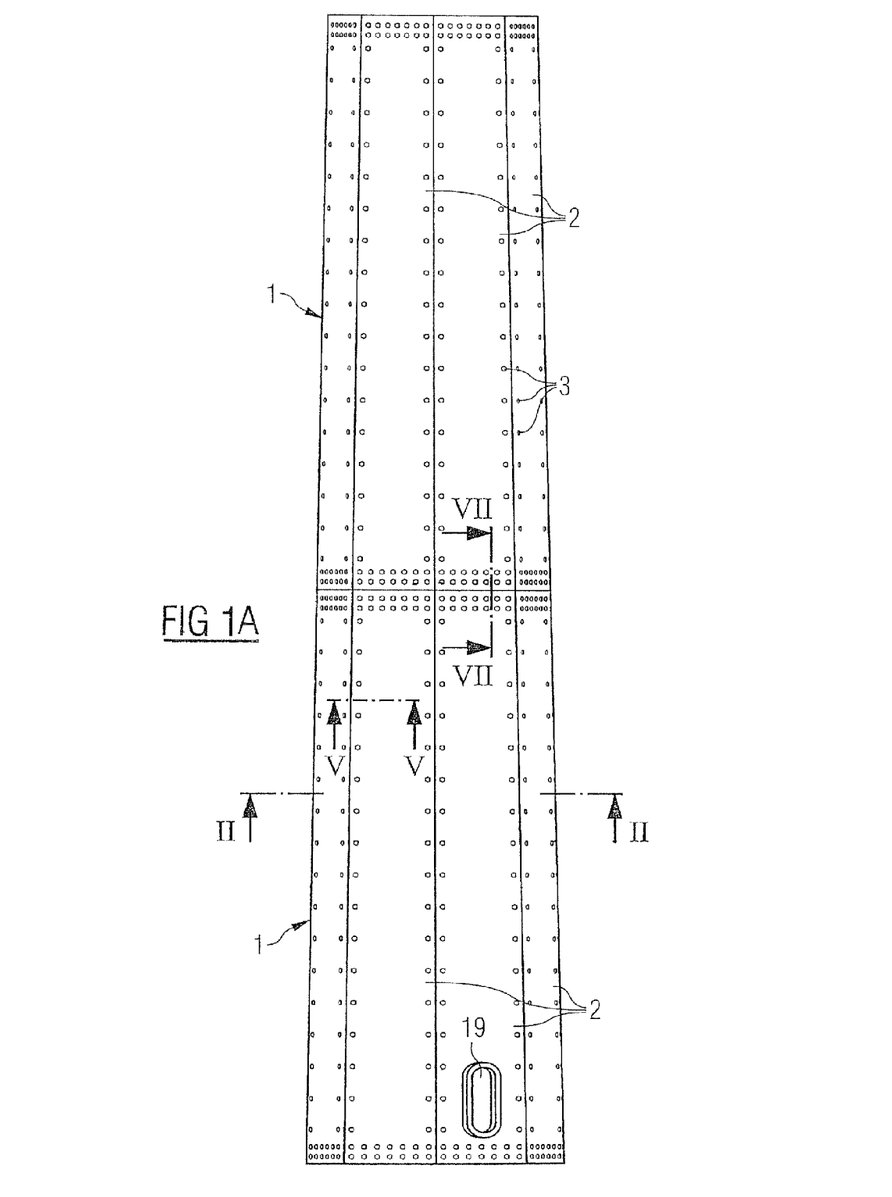
FIG. 1A schematically shows a part of an inventive wind turbine tower in a frontal view.
Figure 1B:
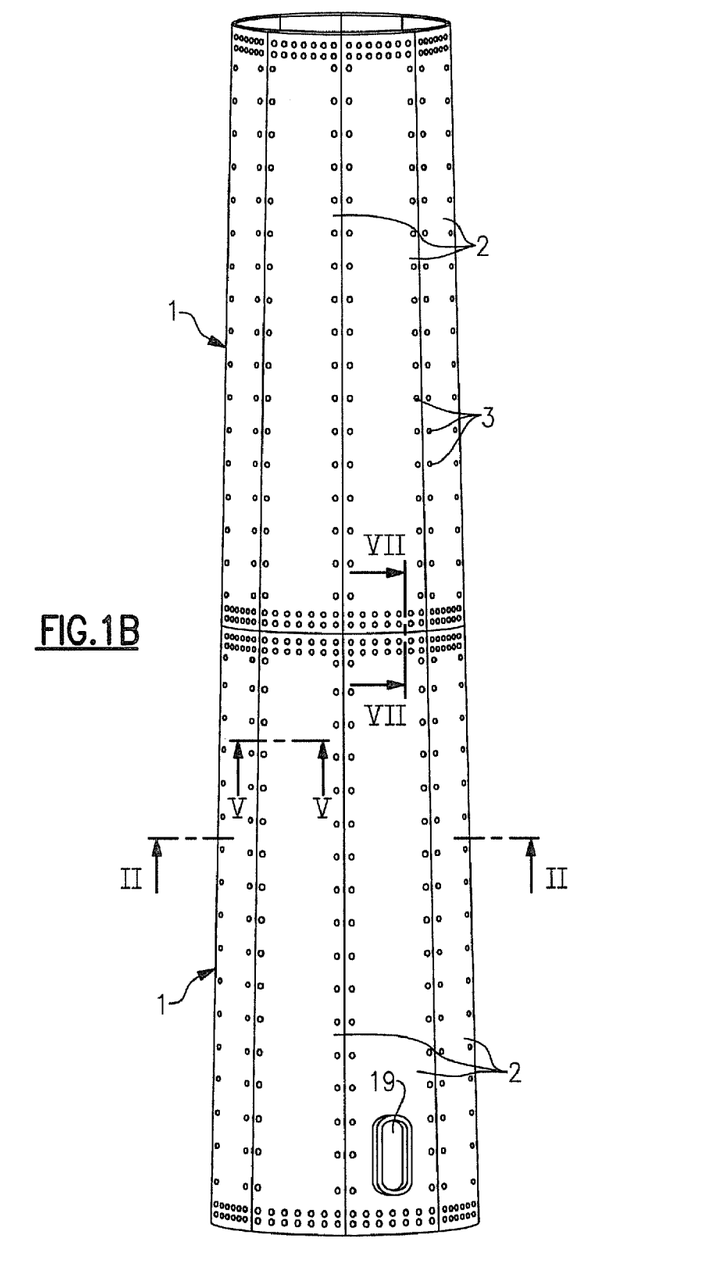
FIG. 1B illustrates a wind turbine tower having a cylindrical appearance.
Figure 1C:
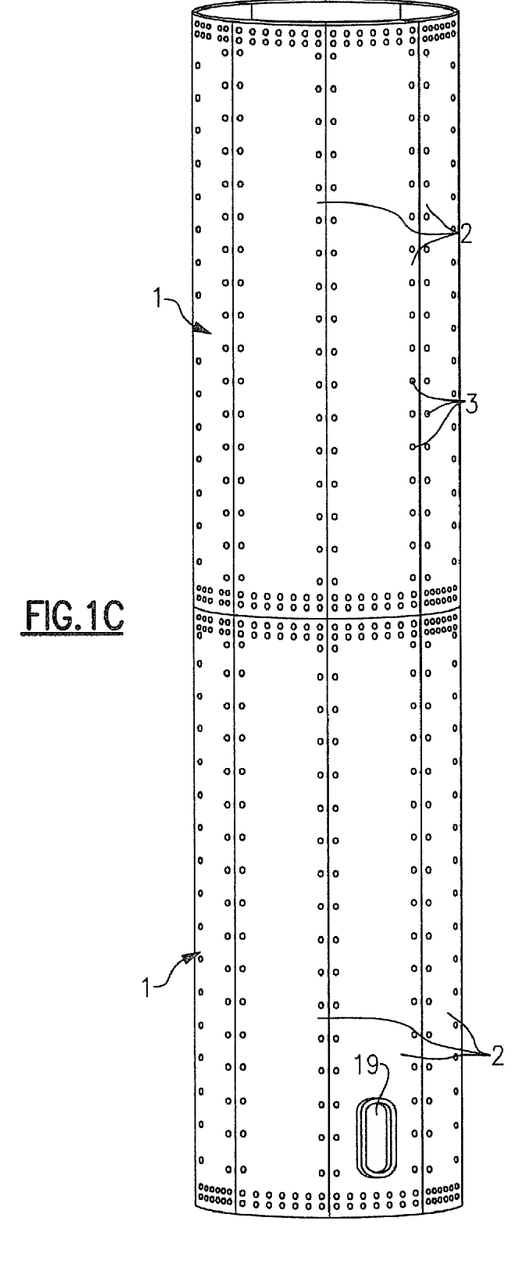
FIG. 1C illustrates a wind turbine tower having a conical appearance.

A first embodiment of the inventive wind turbine tower will now be described with respect to FIGS. 1 to 7. FIG. 1 schematically shows part of an inventive wind turbine tower in a frontal view. The wind turbine tower comprises segments 1 which are connected to each other by means of bolts 3 and splice plates. The lowermost segment 1 includes a door 19, a manhole or the like to allow entering the interior of the tower after it is erected.

Each segment 1 comprises a number of flat plates 2. The flat plates 2 can have a trapezoid shape, as shown in FIG. 1A or, alternatively, a rectangular shape. They can be made of steel or rust resistant steel. Preferably the flat plates 2 have a width of 2.5 to 3 meters and a length of 10 to 14 meters. As an alternative to the flat shape of the flat plates 2 the flat plates 2 can also be corrugated plates. The flat plates 2 are also connected to each other by means of bolts 3 and splice plates. Instead of splice plates or bolts also flanges, nuts, bolt extensions or washers can be used. Referring to the embodiment of FIG. 1B, flat plates 2 have a trapezoid shape resulting in the tower having a conical appearance. Referring to the embodiment of FIG. 2B, flat plates 2 have a rectangular shape resulting in the tower having a cylindrical appearance.

Figure 2:
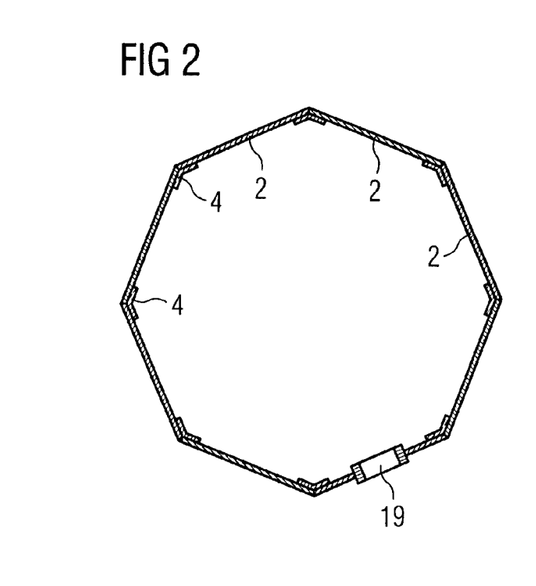
FIG. 2 schematically shows a sectional view along the A-A direction of the inventive wind turbine tower which is shown in FIG. 1.

FIG. 2 schematically shows a sectional view along the A-A direction of the wind turbine tower which is shown in FIG. 1. One can see in FIG. 2 that the flat plates 2 are connected to each other to form a polygonal cross section. In the present embodiment eight flat plates 2 form an octahedral cross section. Instead of eight flat plates 2 also six or ten or any other number of flat plates 2 greater than three can be used to form a polygonal cross section. The flat plates 2 are connected to each other by means of splice plates 4. The splice plates 4 are bent to form an angle between the connected flat plates 2. The angle is adapted to the polygonal cross section to be formed by the plates.

Figure 3:
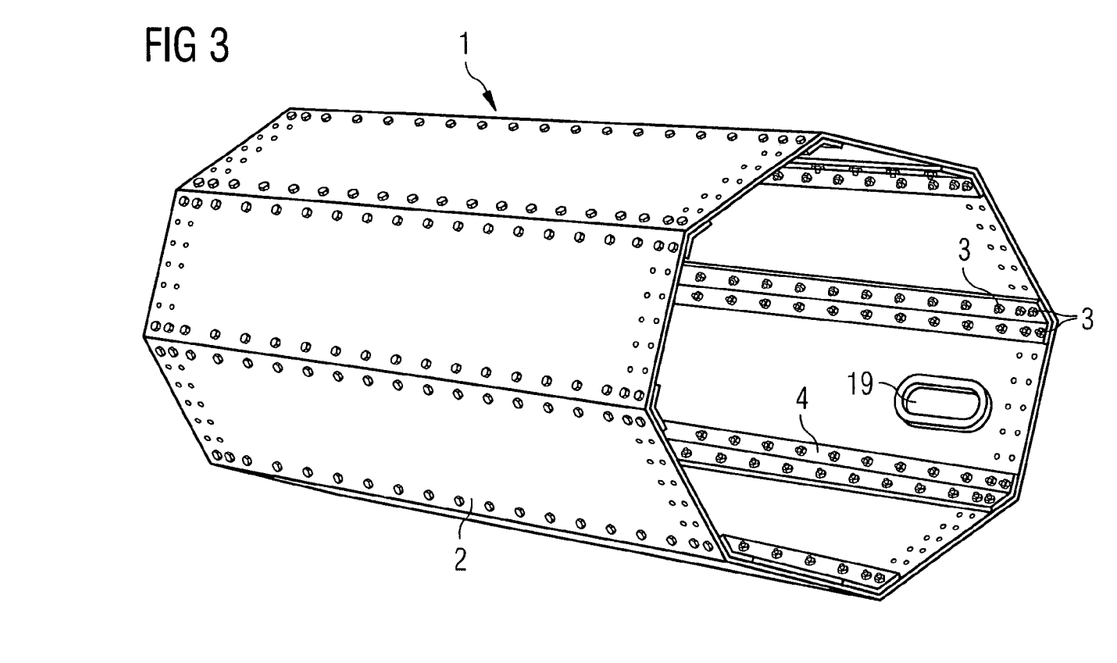
FIG. 3 schematically shows a segment of an inventive wind turbine tower in a horizontal position in a perspective view.
Figure 4:
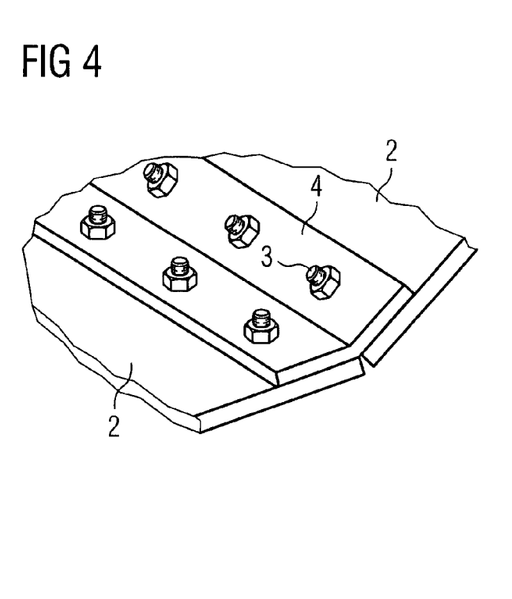
FIG. 4 schematically shows the connection between two flat plates by means of a splice plate in a perspective view.

FIG. 3 schematically shows a segment 1 of an inventive wind turbine tower in a horizontal position in a perspective view. One can see in FIG. 3 eight flat plates 4 which form a segment 1. The segment 1 has an octahedral cross section. The used flat plates 2 are connected to each other by means of splice plates 4. The splice plates 4 are fixed to the flat plates 2 by bolts 3.

FIG. 4 schematically shows again an enlarged section of a connection between two flat plates 2 by means of a bent splice plate 4 in a perspective view. Each flat plate 2 is connected to the splice plate 4 by means of bolts 3 and the splice plate 4 connects the two flat plates to each other. The flat plates 2 and the splice plates 4 can be pre-treated with friction creating material on the jointing surfaces. The holes in the flat plates 2 and the splice plates 4 for the bolts can generally be cut by means of plasma, oxygen/gas or a laser.

Figure 5:
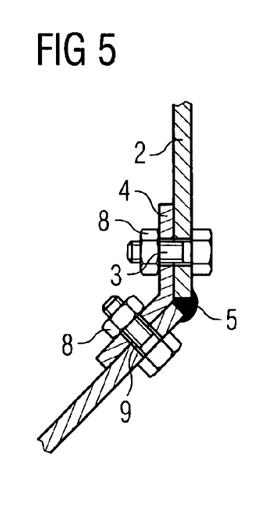
FIG. 5 schematically shows a sectional view along the B-B direction in FIG. 1.

FIG. 5 schematically shows a sectional view along the B-B direction in FIG. 1. One can see in FIG. 3 two flat plates 2 which are connected to each other by means of a bent splice plate 4. The splice plate 4 is connected to each flat plate 2 by means of a bolt 3. The bolt 3 is fixed by a screw nut 8. Further, a sealed strip 5 is visible at the joint between the two flat plates 2 to prevent water and dust to invade the turbine tower and to improve the visual appearance of the tower. Instead of a seal strip a compound can also be used.

Figure 6:
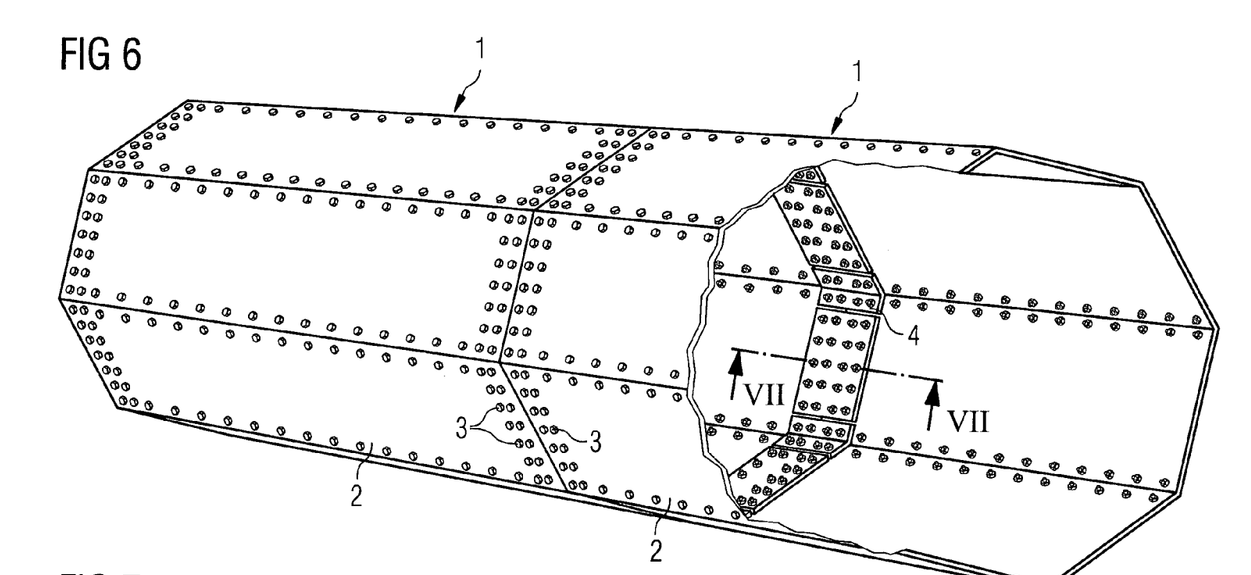
FIG. 6 schematically shows the connection between two segments by means of splice plates in a horizontal position in a perspective view.

FIG. 6 schematically shows the connection between two segments 1 by means of splice plates 4 in a horizontal position in a perspective view. The segments 1 are assembled of flat plates 2. The splice plates 4 are connected to the flat plates 2 of the segment 1 by means of bolts 3.

Figure 7:
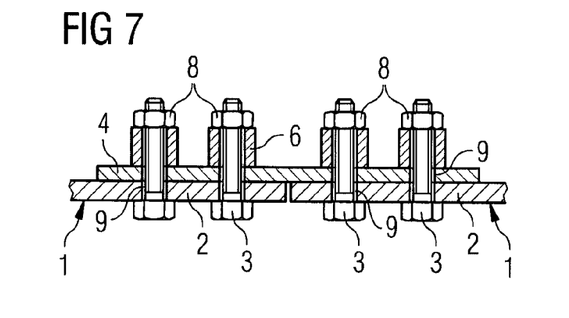
FIG. 7 schematically shows a sectional view along the C-C direction in FIG. 1.

FIG. 7 schematically shows the connection between two segments 1 of the inventive wind turbine tower in a sectional view along C-C direction in FIG. 1 and FIG. 6. One can see in FIG. 5 two flat plates 2 which belong to two different segments 1. The two segments 1 are connected to each other by a splice plate 4 which is not bent. The flat plates 2 and the splice plate 4 comprise holes 9 through which bolts 3 connect the flat plates 2 and the splice plates 4 to each other. The bolts 3 are fixed by screw nuts 8 and bolt extensions 6.

Generally the whole wind turbine tower can be constructed of the described segments 1. Alternatively only a part of the tower, for instance the large diameter bottom section, can be constructed of the described segments 1. Advantageously the splice plates 4 inside the tower can comprise fixing devices, for instance ladder brackets, platform brackets, lift brackets, cable brackets.

An alternative construction of the inventive wind turbine tower will now be described as a second embodiment with respect to FIGS. 8 and 9. Elements which correspond to the elements of the first embodiment are designated with the same reference numerals and will not be described again to avoid repetition.

Figures 8, 9:
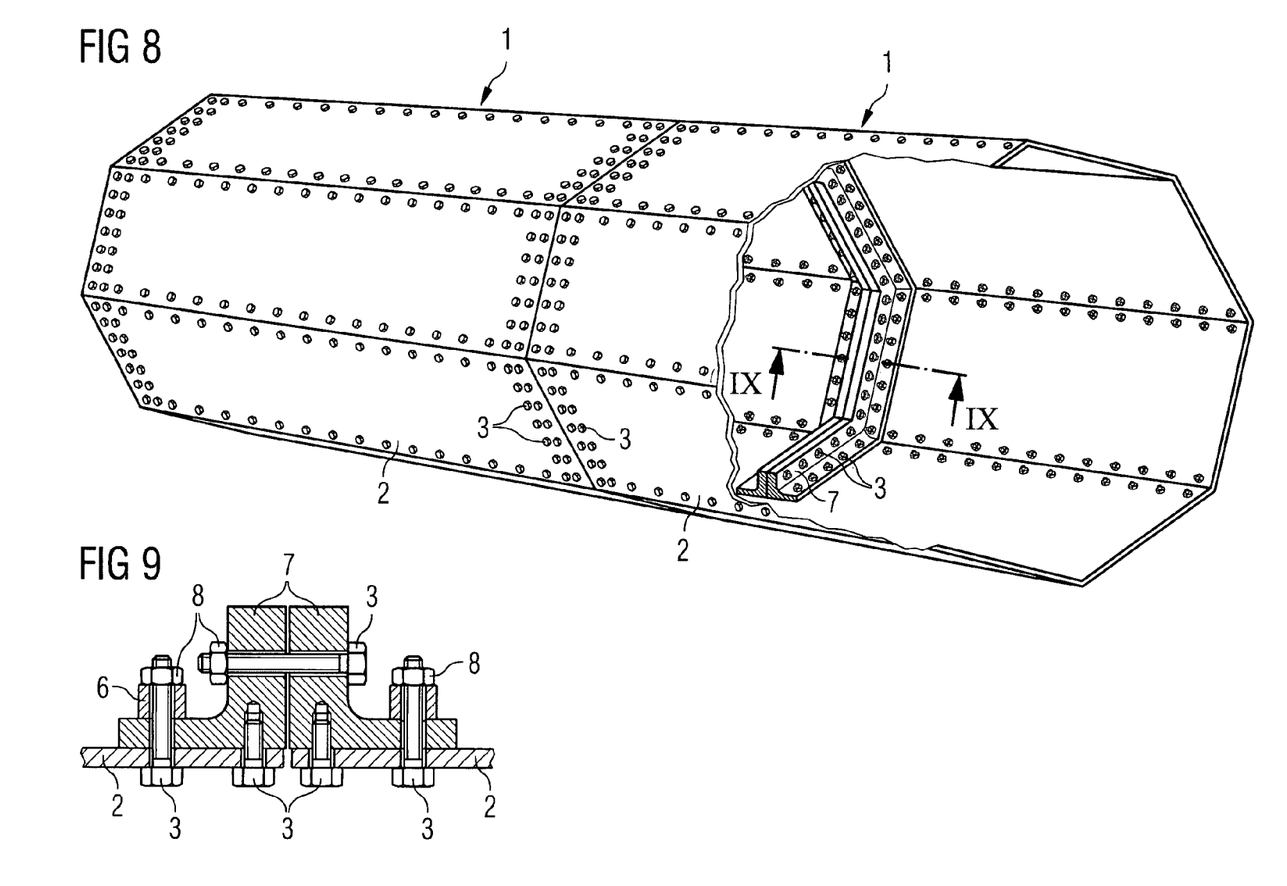
FIG. 8 schematically shows the connection between two segments by means of flanges in a horizontal position in a perspective view.
FIG. 9 schematically shows an alternative sectional view along C-C in FIG. 1.

FIG. 8 schematically shows as an alternative to FIG. 6 the connection between two segments 1 by means of flanges 7 in a horizontal position in a perspective view. Each segment 1 has an octahedral cross section and comprises eight flat plates 2. Each segment 1 is connected to flanges 7 by means of bolts 3. The flanges 7 of different segments 1 are fixed to each other by bolts 3 which can be tightened from the inside of the segment 1. This allows an easier mounting of the tower than in the case of using splice plates for connecting segments, which was described in the first embodiment.

FIG. 9 shows a sectional view along the C-C direction of FIG. 8. One can see in FIG. 9 two flat plates 2 which belong to different segments 1. In contrast to the first embodiment the two flat plates 2 are now connected by means of flanges 7. A flange 7 is connected to each flat plate 2 by means of bolts 3. One can see in FIG. 9 two bolts 3 which are screwed directly into the flange 7. Two other bolts 3 connect a flat plate 2 and a flange 7 by means of bolt extensions 6 and screw nuts 8. The two flanges 7 are connected to each other by a bolt 3 and a screw nut 8. The advantage of using flanges 7 is that they provide a very stable connection between the flat plates 2 or, more precisely, the segments 1.

In addition to connecting segments 1 by flanges 7 the flat plates 2 of a segment 1 can also be connected to each other by flanges 7. However, any combination of splice plates 4 and flanges 7 for connecting the flat plates 2 and the segments 1 are possible, for example splice plates 4 for connecting the flat plates 2 and flanges 7 for connecting the segments 1.

It is especially possible to connect the flat plates 2 along their whole long side to each other by splice plates 4. In this case the segments 1 can be connected to each other by flanges 7 which are located only on parts of the short side of the flat plates 2 where no splice plate 4, which connects the flat plates 2 to each other, is placed. An alternative is it to connect the segments 1 around the whole circumference of their cross section by flanges 7 to each other. In this case the flat plates 2 of a segment 1 may be connected to each other by splice plates 4 along only parts of their long side, where no flange 7, which connects the segments 1 to each other, is located.

Figure 11:
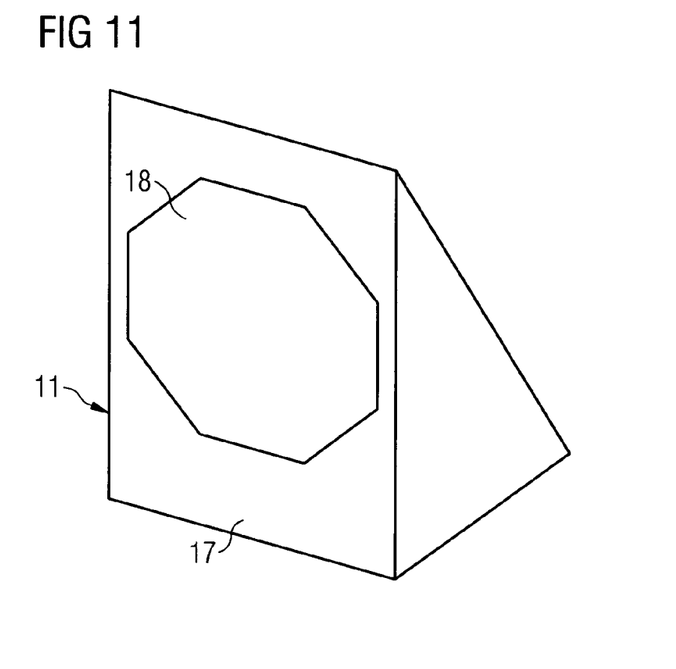
FIG. 11 schematically shows a rotation tool in a perspective view.
Figure 12:
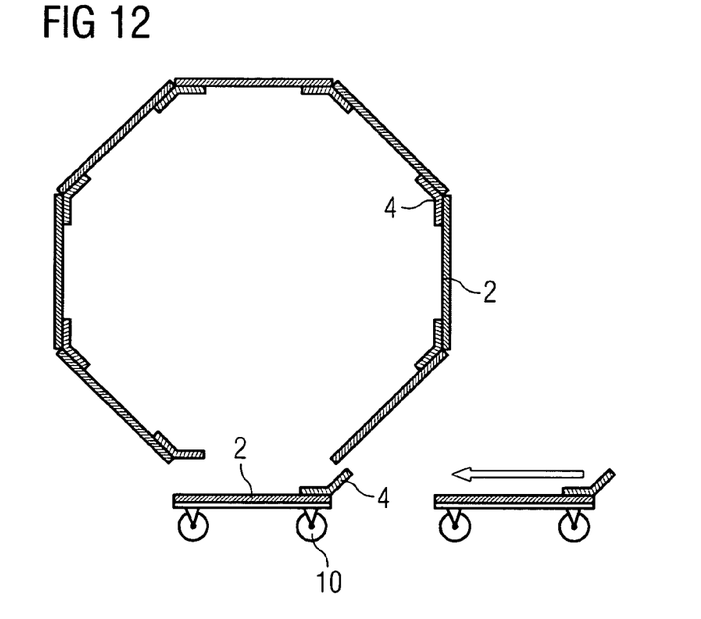
FIG. 12 schematically shows the assembling of flat plates to a segment in a sectional view.

In a third embodiment the inventive method for constructing a wind turbine tower will be described with respect to FIGS. 10 to 12. Elements corresponding to elements of the previous embodiments are designated with the same reference numerals and will not be described again to avoid repetition.

Figure 10:
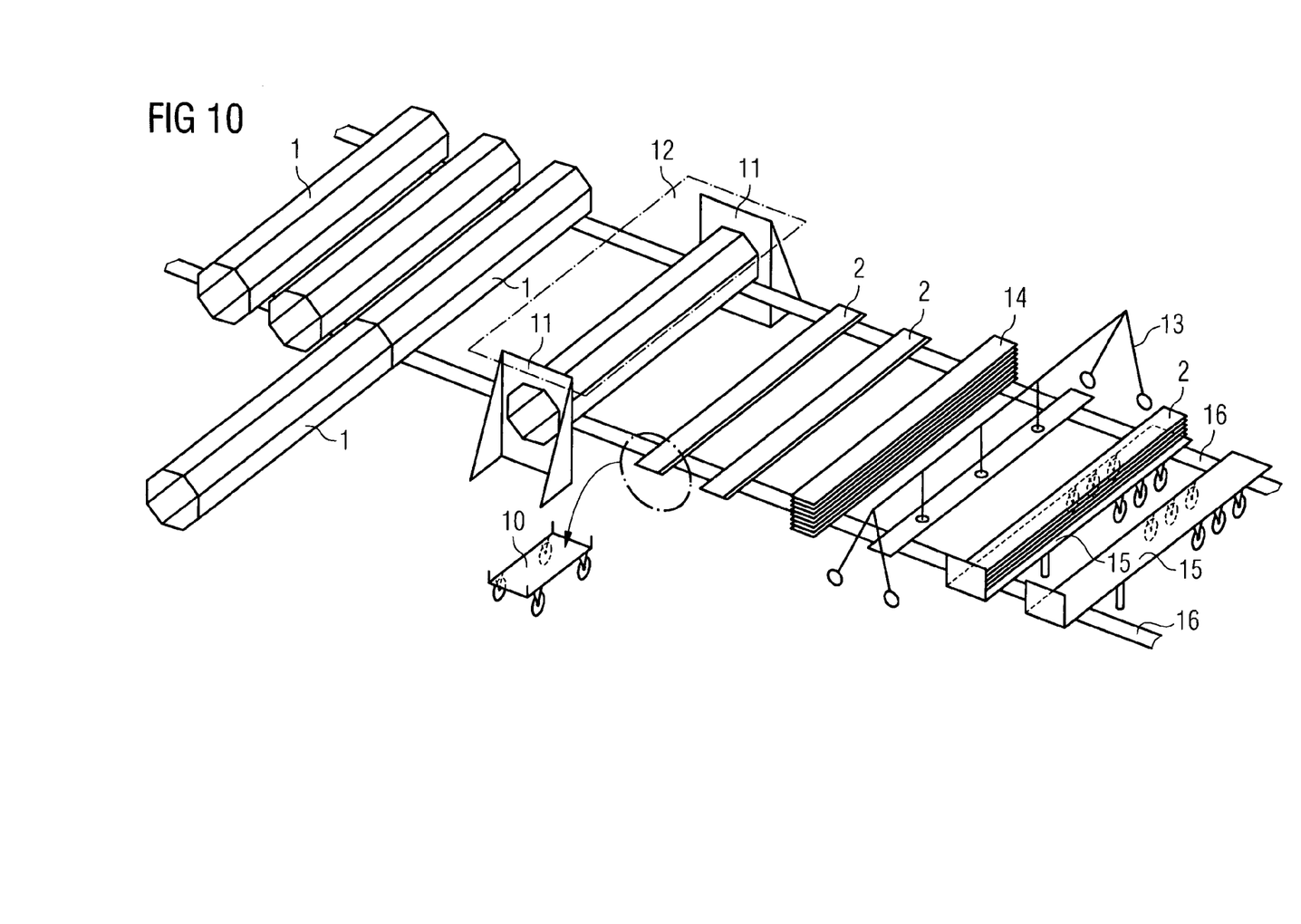
FIG. 10 schematically shows an assembly site close to an installation site of an inventive wind turbine tower.

In FIG. 10 an assembly site is sketched which is close to the installation site of an inventive wind turbine tower. One can see in FIG. 10 rails 16 with transport carts 15, a crane 13, a plate storage 14, carriages 10 and a rotation tool 11. At first the delivered flat plates 2 are transported to the installation site by transport carts 15 which is sketched on the right side of FIG. 10. Then the flat plates 2 may be lifted from the transport cart 15 by a crane 13 and stored in a plate storage 14. Instead of a crane 13 any other lifting device may be used, for example a magnet or a vacuum lifting device.

For assembling a segment 1 the flat plates 2 can be transported by means of carriages 10 to the rotation tool 11. The rotation tool 11 comprises two parts, one of which is schematically shown in FIG. 11. In FIG. 11 the casing 17 of the rotation tool 11 is visible. The casing 17 comprises an opening 18 with a polygonal cross section. The opening 18 may comprise tools for fixing flat plates 2 and/or splice plates 4 to facilitate the assembly of flat plates 2 and splice plates 4 to segments 1.

The rotation tool 11 may be covered with a tent 12, as it is shown in FIG. 10. The rotation tool 11 allows the flat plates 2 to be connected to the splice plates in a horizontal position. When the splice plate 4 is mounted and two flat plates 2 are connected to each other, the rotation tool 11 can be rotated so that the next flat plate 2 can be assembled to the first two flat plates 2 also in a horizontal position. The mounting of the last flat plate 2 and the last splice plate 4 is sketched in FIG. 12 in a sectional view. One can see in FIG. 12 seven already assembled flat plates 2 and splice plates 4 and the last flat plate 2 and splice plate 4 which is transported to the others by a carriage 10.

It is alternatively possible that the used rotation tool 11 comprises a turning apparatus which can be positioned vertically for attachment of the flat plates 2 and subsequently rotate freely to the next position.

The completely assembled segment 1 can then be transported by rail 16 further from where the segments 1 are assembled. This is shown on the left side of FIG. 10. After assembling the tower it is possible to lift the tower up by means of a crane, for instance.

The inventive wind turbine tower may be constructed of flat steel plates 2 with holes 9 cut for assembly with splice plates 4. The advantage is that the cutting of the plate and holes can be handled by the steel plate supplier. The construction of the wind turbine tower at the installation site using flat plates 4 allows it to use a steel plate supplier close to the place of installation. This makes it possible to avoid the limitations related to using the limited number of suppliers worldwide, who are experienced in producing the circular tubular towers and who are very much in demand in the wind turbine industry.

The flat plates 4 can be sandblasted and surface treated before being transported to the assembly site. With a standard plate size, for example a width of 2.5 meters and a length of 10 to 14 meters, they can be transported to the place of assembly on standard truck trailers which are cost efficient.

Figure 13A:
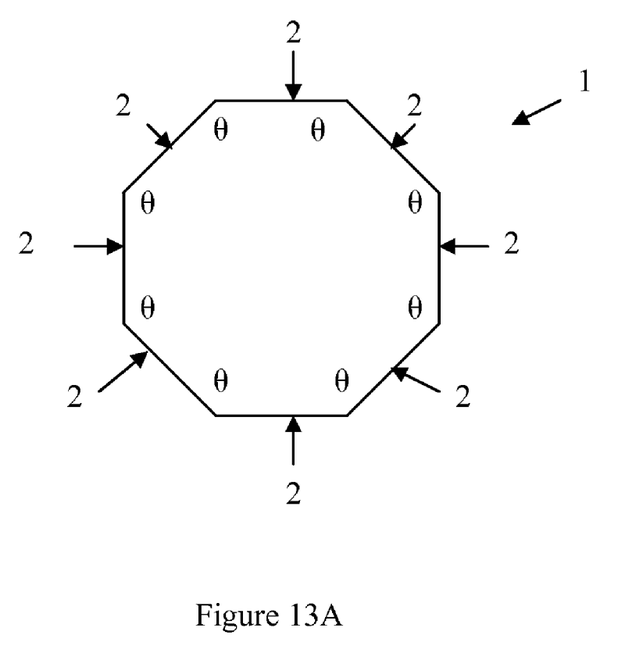
FIG. 13a schematically shows a cross sectional view of a section of the tower with the cross section forming a regular polygon FIG. 13b schematically shows a cross sectional view of the tower with the cross section forming a irregular polygon
Figure 13B:
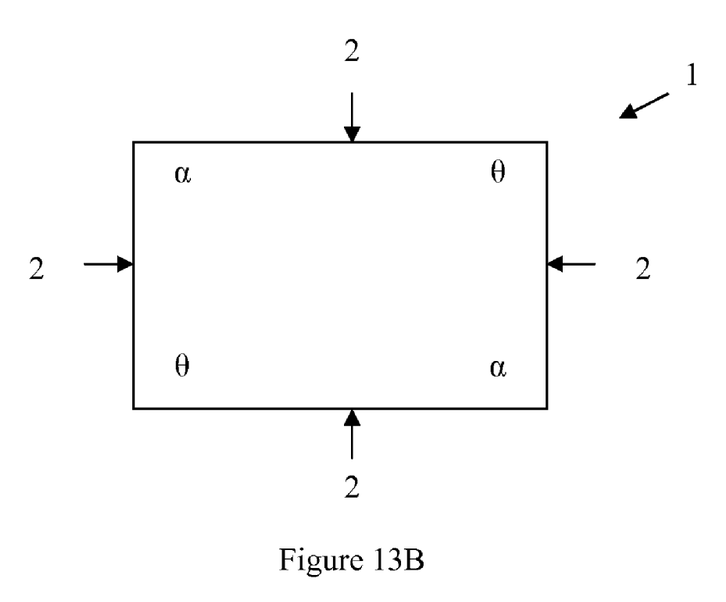

Referring to FIGS. 13a and 13b, a cross section view a section 1 of the tower with a polygonal cross section is provided. A number of flat plates 2 are connected to each other to form the polygonal cross section. In FIG. 13, the cross section of the segment 1 is a regular polygon, which means that the angle θ between adjacent flat plates has the same value. In FIG. 13b, the cross section of the segment 1 is an irregular polygon, which means that the angle between adjacent flat plates varies.

In summary, the invention has the following advantages: the flat plates 2 can be delivered in cut condition by any steel mill. They are easy to surface treat in automatic blasting and surface treatment facilities. The flat plates 4 are easy to transport on standard truck trailers which increases the availability of transportation equipment. Further, the flat plates 4 minimise the manufacturing costs by eliminating the rolling and welding processes necessary for normal tubular towers. The flat plates 4 can be bolted together with splice plates 4 and flanges 7. This eliminates the welding process and subsequent control of welds. Flat plates without welding have the best possible fatigue properties. Moreover, flat plates can be easily assembled in various cross sections of towers, for instance hexagonal cross sections etc. This reduces the risk of buckling of the tower shells. The flat plates 2 can be delivered at length of up to 14 meters which is therefore the maximum possible length of a segment 1.

The invention claimed is:

1. A wind turbine tower configured to support a rotor assembly having a hub and at least one blade, comprising:
    a plurality of wind-turbine-tower segments form the wind turbine tower, each wind-turbine-tower segment having a polygonal cross section, each wind-turbine-tower segment comprises:
        a plurality of flat plates connected to each other to form the polygonal cross section, each flat plate having a first side and a second side facing away from the first side; and
        a plurality of splice plates, which are bent, connect the plurality of flat plates to each other, each of the plurality of splice plates abut to the first side of two of the plurality of flat plates that are arranged adjacently such that the plurality of splice plates are arranged on an inside of the polygon cross section; and
    an external surface of the wind turbine tower formed from the second side of the plurality of flat plates;
    wherein the flat plates substantially enclose the splice plates.

2. The wind turbine tower as claimed in claim 1, wherein the wind-turbine-tower segments are connected to each other via devices selected from the group consisting of splice plates, flanges, bolts, nuts, bolt extensions, washers, and combinations thereof.

3. The wind turbine tower as claimed in claim 2, wherein the splice plates are connected to the flat plates by bolts or nuts.

4. The wind turbine tower as claimed in claim 1, wherein the flat plates and/or the splice plates are made of steel or rust resistant steel.

5. The wind turbine tower as claimed in claim 4, wherein the flat plates and/or the splice plates are pre-treated with a friction creating material on a jointing surface.

6. The wind turbine tower as claimed in claim 5, wherein the flat plates have a rectangular shape, whereby the wind turbine tower has a cylindrical shape.

7. The wind turbine tower as claimed in claim 6, wherein the joint between two flat plates or between a flat plate and a splice plate comprises a seal stripe or a compound.

8. The wind turbine tower as claimed in claim 5, wherein the flat plates have a trapezoid shape, whereby the wind turbine tower has a conical shape.

9. The wind turbine tower as claimed in claim 5, wherein a cross section of the segments is a regular polygon so that an angle between two flat plates that are adjacent has the same value.

10. The wind turbine tower as claimed in claim 5, wherein the cross section of the segments is an irregular polygon, so that an angle between two flat plates that are adjacent varies.

11. The wind turbine tower as claimed in claim 1, wherein at least one splice plate comprises a fixing device.

12. A method for constructing a wind turbine tower configured to support a rotor assembly having a hub and at least one blade, comprising:
    providing a plurality of flat plates having a first side and a second side facing away from the first side;
    connecting the flat plates to each other via a plurality of bent splice plates to form wind-turbine-tower segments each having a polygonal cross section, each bent splice plate abuts to the first side of two of the plurality of flat plates which are arranged adjacently to form the interior of the wind-turbine-tower segments; and connecting the wind-turbine-tower segments to one another to form the wind turbine tower such that an external surface of the wind turbine tower formed from the second side of the plurality of flat plates;
wherein the flat plates substantially enclose the splice plates.

13. The method as claimed in claim 12, wherein the wind-turbine-tower segments are connected to each other by splice plates or flanges.

14. The method as claimed in claim 13, wherein the flat plates and/or the wind-turbine-tower segments are connected to each other in a horizontal position.

15. The method as claimed in claim 14, wherein the flat plates and/or the wind-turbine-tower segments are turned into a predefined position by a rotation tool for connecting the flat plates and/or the wind-turbine-tower segments to each other.

16. The method as claimed in claim 15, wherein each wind-turbine-tower segment or the tower is erected after each wind-turbine-tower segment or the tower is assembled.

* * * * *